(12) United States Patent
Dajer et al.

(10) Patent No.: US 6,781,980 B1
(45) Date of Patent: Aug. 24, 2004

(54) CDMA TRANSMITTER AND METHOD GENERATING COMBINED HIGH-RATE AND LOW-RATE CDMA SIGNALS

(75) Inventors: Miguel Dajer, Succasunna, NJ (US); Peter K. LaConte, West Paterson, NJ (US); Harvey Rubin, Township of Morris, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/176,922

(22) Filed: Oct. 22, 1998

(51) Int. Cl.[7] .............................................. H04B 7/216
(52) U.S. Cl. ..................... 370/342; 370/320; 375/131
(58) Field of Search .............................. 370/320, 342, 370/335, 441, 477, 478, 479; 375/131

(56) References Cited

U.S. PATENT DOCUMENTS

| | | |
|---|---|---|
| 5,319,672 A | 6/1994 | Sumiya et al. |
| 5,555,268 A | 9/1996 | Fattouche et al. |

(List continued on next page.)

FOREIGN PATENT DOCUMENTS

| | | |
|---|---|---|
| EP | 0 833 456 A2 | 4/1998 |

OTHER PUBLICATIONS

"cdma2000: A Third–Generation Radio Transmission Technology" by Douglas N. Knisely, Quinn Li, and Nallepilli S. Ramesh, Bell Labs Technical Journal, Jul.–Sep. 1998, pp. 63–78.

(List continued on next page.)

*Primary Examiner*—Steven H. D Nguyen
*Assistant Examiner*—Thien Tran

(57) ABSTRACT

A wideband code division multiple access (CDMA) communication system overlayed on an IS-95 network generates two or more digital bit streams from a group of wideband digital data streams, each digital bit stream spread to form a CDMA component signal. Each CDMA component signal is combined with a corresponding IS-95 digital bit stream to form a composite CDMA signal, allowing a base station to share transmitter subsystems between the wideband and IS-95 systems. For up to three carrier frequencies, up to three composite CDMA signals are employed. A digital bit stream for a group of summed user conversations in the IS-95 system modulates a respective RF carrier frequency to generate a low-power RF signal. The CDMA component signals of the wideband CDMA system are generated so each has a chip rate identical to the chip rate of the digital bit streams of the IS-95 system. The baseband digital data streams for all wideband user conversations are summed digitally for each targeted RF carrier frequency to produce the composite wideband digital signal for each targeted frequency. In one application, each composite wideband digital signal, each at the IS-95 chip rate, is then used to modulate a carrier frequency which is either the same, or has approximately the same frequency and phase as the carrier frequency used in the IS-95 system. Three low-power RF signals are produced in the wideband system, each having the same spectral characteristics as the corresponding low-power RF signals generated in the IS-95 system. These low-power RF signals at the same frequency are combined into a single signal provided to the amplifier and antenna subsystem of a base station transmitter. In another application, each composite digital signal is digitally combined with a respective IS-95 digital bit stream prior to modulation by respective RF carrier. Therefore, signal combining between the IS-95 and wideband CDMA portions of a base station system is accomplished either digitally or with RF signals prior to amplification, thereby allowing the IS-95 system and wideband CDMA system portions of the base station to share RF filters, amplifiers and antennas of the base station transmitters.

33 Claims, 6 Drawing Sheets

U.S. PATENT DOCUMENTS

| | | | |
|---|---|---|---|
| 5,583,851 A | | 12/1996 | Kato et al. |
| 5,640,385 A | * | 6/1997 | Long et al. ................... 370/18 |
| 5,956,345 A | | 9/1999 | Allpress et al. |
| 6,141,332 A | * | 10/2000 | Lavean ....................... 370/335 |
| 6,256,290 B1 | | 7/2001 | Ramesh |
| 6,269,126 B1 | * | 7/2001 | Toskala et al. ............. 375/265 |
| 6,275,509 B1 | * | 8/2001 | Schlosser et al. ........... 370/527 |

OTHER PUBLICATIONS

"A Multicarrier CDMA System with Adaptive Subchannel Allocation For Forward Links" by Yun Hee Kim, et al., IEEE Transactions On Vehicular Technology, vol. 48, No. 5, Sep. 1999, pp. 1428–1436.

"Broadband–CDMA Overlay" by Donald L. Schilling, Gary R. Lomp and Joseph Garodnick, 1993 $43^{rd}$ IEEE, Vehicular Technology Conference, May 18–20, 1993, pp. 452–455.

"Spectrally Overlaid Narrow–Band and Wide–Band CDMA Systems" by Il Gyu Kim, Dongwoo Kim and Dong Geun Jeong, IEEE Communications Letters, vol. 1, No. 3, May 1997, pp. 74–76.

"Performance of a Coded Multi–Carrier DS–CDMA System in Multi–Path Fading Channels" by Qingxin Chen, Elvino S. Sousa and Subbarayan Pasupathy, Wireless Personal Communications 2, 1995, pp. 167–183.

* cited by examiner

CDMA TRANSMITTER AND METHOD GENERATING COMBINED HIGH-RATE AND LOW-RATE CDMA SIGNALS

BACKGROUND OF THE INVENTION

1. Field of the Invention

The present invention relates to communications, and, in particular, to spread-spectrum wireless communications systems.

2. Description of the Related Art

The IS-95 standard, an interim standard published by the Telecommunications Industry Association, is an existing wireless communications standard that is based on spread spectrum communication techniques, also known as code division multiple access (CDMA) techniques. As is known in the art, CDMA techniques employ channels distinguished by different spreading codes. By combining each signal with the spreading code for the channel, each signal is spread over a much wider frequency band than the frequency band occupied by the signal prior to combining with the spreading code. This differs from traditional time division multiple access in which each channel transmits during a unique time frame and frequency division multiple access systems in which each channel is designated a unique portion of an available frequency band and/or modulates a unique carrier.

FIG. 1 is a block diagram showing a typical wireless IS-95 network 100. Network 100 includes a group of remote users 112–115 generally in communication with base stations 109–110 through an air interface. Base stations 109–110 are, in turn, connected to a land line network 102 through a switching center 104, which tracks the positions of remote users 112–115 in the network and allocates capacity of base stations 109–110 to remote users 112–115.

In FIG. 2, there is shown a block diagram of a transmit portion, or forward link, of a base station 109–110 of the network 100. The forward link in a communications network is the communication path through a CDMA communication channel of the air interface from a base station 110, for example, to one or more of remote users 112–115 (e.g., wireless telephones). The reverse link is defined for each remote user and is the communication path from one of the remote users 112–115 to the base station 110. For the forward link, digital signal processing block 202 performs processing of voice, voiceband data, or digital data signals from the land line network 102. Radio Frequency (RF) modulation section 204 typically receives the processed signals from digital signal processing block 202, and modulates an RF carrier signal with the processed signals in multiplier 208. The optional D/A converter 206 converts a digital bit stream of the processed signals to analog signals used to amplitude or frequency modulate the RF carrier signal. The D/A converter 206 is shown as an option since, in alternative systems, digital bit values of the processed signals may be used to directly modulate the phase of the RF carrier signal. The modulated RF carrier signal is typically a low-power signal, which is then amplified to a high power signal in RF amplifier 210. The high power signal is filtered in transmit filter 212, and provided to air interface by antenna 214.

FIG. 2 illustrates a single modulation path for a processed IS-95 signal modulating a single RF carrier signal and occupying, for example, a 1.25-MHz bandwidth. However, as is known in the art, multiple processed IS-95 signals may be transmitted in different frequency bands, each having a 1.25-Mhz bandwidth. An IS-95 transmit portion having several IS-95 signals modulating M carriers and transmitted in M different frequency bands is shown in FIG. 3.

Referring now to FIG. 3, there is shown a block diagram of a transmit portion of a base station (e.g. 110) of IS-95 wireless network 100. Base station 110 of wireless network 100 comprises M IS-95 signal generators 302 (where M is an integer greater than 0), combiner 304, and RF circuitry 306 and antenna 308. Each signal generator 302 receives low-rate (narrowband) data streams for up to 64 different users and processes that low-rate data to generate a communications signal conforming to the IS-95 standard. Each signal generator 302 of a base station 110 in network 100 generates an IS-95 signal at a different carrier frequency. The signals from the different signal generators are combined by combiner 304, which may typically be an analog RF combiner. The combined signal is processed by high-power RF circuitry 306 for transmission by antenna 308 to any number of the wireless unit remote users 112–115.

According to the IS-95 standard, the narrowband data stream for each user is multiplied by a particular code sequence and then modulated at a particular carrier frequency. For a given signal generator 302, the narrowband data stream for each user is encoded with a different code sequence, but modulated at the same carrier frequency. The effect of modulating the narrowband data for multiple users at the same carrier frequency is to spread all of the narrowband data for each user over the entire carrier-frequency band. In order to ensure that the modulated signals for different users do not interfere with one another, the code sequences are selected to ensure that the modulated signal for each user is orthogonal to the modulated signals for all other users in the same carrier-frequency band.

The IS-95 standard employs an RF signal for a carrier-frequency band that has a 1.25-MHz bandwidth, and which contains the encoded samples of several (up to 64) user conversations (voice or data sessions). Each user conversation comprises a baseband user signal of up to 9.6 Kbps, or possibly 14.4 Kbps, that is spread in bandwidth by a 1.228-MHz direct sequence digital encoding signal. The spreading rate, also known as the chip-rate, is therefore 1.228-MHz in the IS-95 standard. The encoding is achieved by using, for each user conversation, one of a set of 64 orthogonal Walsh codes, also known as Walsh functions or Walsh sequences. The Walsh codes of a given set are orthogonal in that the receiver reproduces the original user signal only if the received signal is demodulated with the same Walsh code used at the transmitter. Otherwise, uncorrelated noise is produced in the receiver. The digital signals of each user can simply be added together before being applied to the modulation part of the RF subsystem, as shown in FIG. 3.

Referring now to FIG. 4, there is shown a block diagram of a portion of each signal generator 302 of FIG. 3 of base station 110 of wireless network 100. According to the IS-95 standard, each signal generator 302 is capable of supporting low-rate (narrowband) data streams for up to 64 different users using a single carrier frequency. Each user is assigned a different one of 64 orthogonal IS-95 forward-link Walsh codes. FIG. 4 shows the processing performed on the data stream for one of the users supported by an exemplary implementation of signal generator 302. That is, blocks 402, 404, 406, 408, 410 and 412 shown in FIG. 4 would be repeated within signal generator 302 for each user with its own data.

In particular, for a single user data stream, convolutional encoder 402 provides a degree of error protection by applying convolutional encoding to the user's data stream to generate encoded signals. Block interleaver 404 applies block interleaving to the encoded signals to generate interleaved signals. Block interleaver 404 provides further error protection by scrambling data in time. In a parallel path, long pseudo-noise (PN) code generator 406 generates code sequences that are then decimated by an integer value in decimator 408 to reduce the length of the sequence so as to prevent identification of the sequence. The sequences provided by the long PN code generator 406 and decimator 408 perform encryption to provide a degree of security to the communications process. Multiplier 410 combines the interleaved signals from block interleaver 404 with the decimated code signals from decimator 408.

The resulting signals from multiplier 410 are then combined with one of the 64 different Walsh sequences $W_N$ by Walsh-code multiplier 412. Multiplying signals by a unique Walsh sequence $W_N$ makes the resulting signals orthogonal to (and therefore non-interfering with) the signals for all of the other users of signal generator 302, each of which is multiplied by a different Walsh sequence.

For multiple users, the signals generated by each user's Walsh-code multiplier 412 are summed in summer 413, and then processed along two parallel paths. In the first path, multiplier 414 combines the summed signals from Walsh-code multipliers 412 with the signal $P_I(t)$ and the signals from multiplier 414 are then combined by multiplier 416 with the signals (cos $W_{cm}t$), where $w_{cm}$ is the carrier frequency for the $m^{th}$ signal generator 302 of network 100. In the second path, multiplier 418 combines the signals from Walsh-code multipliers 412 with the signal $P_Q(t)$ and the signals from multiplier 418 are then combined by multiplier 420 with the signals (sin $W_{cm}t$). $P_I(t)$ and $P_Q(t)$ are the in-phase part and the quadrature-phase part, respectively, of short PN codes used in quadrature-phase shift-keying (QPSK) spread-spectrum modulation. As such, multipliers 414 and 418 may ensure that the signals are spread over the full carrier-frequency band. Multipliers 416 and 420 provide in-phase and quadrature modulation of the signals, respectively, by the carrier frequency $w_{cm}$.

The signals from multipliers 416 and 420 are combined at summation node 422 to generate one of M low-power RF signals transmitted from each IS-95 signal generator 302 to combiner 304 of FIG. 3. Multipliers 414–420 and summation node 422 combine to operate as a signal modulator/spreader.

The 1.25-MHz bandwidth in the IS-95 standard limits the data rate with which a remote user can access the system, since the present IS-95 standard specifies low-rate data transmission for a single user. To achieve an even higher data rate for a user, one new proposed wideband CDMA standard defines CDMA processing occupying a 3.75-MHz bandwidth, rather than the 1.25-MHz bandwidth of IS-95. Allowing for guard bands at the edges of each 1.25-MHz IS-95 carrier-frequency band, the 3.75-MHz bandwidth of the wideband CDMA standard occupies a 5-MHz total bandwidth.

FIG. 5 illustrates the relationship between carrier frequency bands for the IS-95 standard and the proposed wideband standard occupying a 5-MHz total bandwidth. Each of three IS-95 carrier-modulated digital streams occupies respective 1.25-MHz carrier-frequency bands 503, 504, and 505 centered around respective carriers $f_1$, $f_2$, and $f_3$. The 3.75-MHz wideband CDMA signal of carrier frequency band 502 occupies a 5-MHz total bandwidth spectrum, and is equivalent to that occupied by three IS-95 carrier-frequency bands.

Networks conforming to the IS-95 standard are limited to 64 users for each carrier frequency. Moreover, each user is limited to relatively low data-rate communications such as telephone-based voice signals. Under the IS-95 standard, each data stream is limited to a maximum of 9.6 kilo-bits per second (kbps) or 14.4 kbps. Thus, while IS-95 networks are sufficient for typical use by multiple mobile telephone users, they are nevertheless unable to support high data-rate applications. It is desirable, therefore, to design a wideband CDMA wireless communications system that supports high data-rate applications higher than those supported by conventional IS-95 networks. The transmit RF chain is generally one of the most expensive parts of a base station design, and it is desirable to reuse these components in an existing base station that is updated to handle both IS-95 and wideband CDMA communication. Since the equipment for such communication networks is extremely expensive and since an IS-95 infrastructure already exists, it is also desirable to provide a solution that is backwards compatible with IS-95 technology and the existing IS-95 infrastructure.

SUMMARY OF THE INVENTION

The present invention is directed to an RF transmit portion of a base station which supports, in a single RF processing portion or RF subsystem, either 1) low-rate CDMA communication channels alone, such as those confirming to an IS-95 standard; 2) high-rate CDMA communication channels alone, such as those conforming to proposed Wideband CDMA standards; 3) both types of communication channels together in a frequency overlay; or 4) combinations of these in different wideband carrier frequency bands, for example, 5-MHz bands. In accordance with the present invention, components of the RF subsystem may be shared between the low-rate and high-rate CDMA systems within the base station.

In accordance with the present invention, a transmitter of a CDMA network is adapted so as to overlay a frequency band of a high-rate CDMA channel onto frequency bands of one or more low-rate CDMA channel signals. The transmitter includes a high-rate CDMA processor, which generates two or more component CDMA data signals for each user data signal received by the high-rate data processor, and one or more low-rate CDMA processors, each generating a low-rate CDMA channel signal for at least one user data signal received by the low-rate CDMA processor. The transmitter further includes a combiner section, adapted to combine each component CDMA data signal with a different low-rate CDMA channel signal and a carrier signal to generate a low-power modulated carrier signal. For a further embodiment, an amplifier receives each low-power modulated carrier signal and generates a high-power transmit signal, wherein the power of the high-power transmit signal is greater than the power of each low-power modulated carrier signal.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The following preferred embodiments of the present invention are described with respect to low-rate CDMA communication channels conforming to the IS-95 standard and high-rate CDMA communication channels conforming to the proposed Wideband CDMA standard. Here, the terms "high-rate" and "low-rate" refer to relative data rates of, for example, user's data of wideband and IS-95 standards, respectively. However, the present invention is not so limited, and may be employed with other CDMA systems in which high-rate CDMA channel signals are overlayed with low-rate CDMA channel signals.

Figure 1:
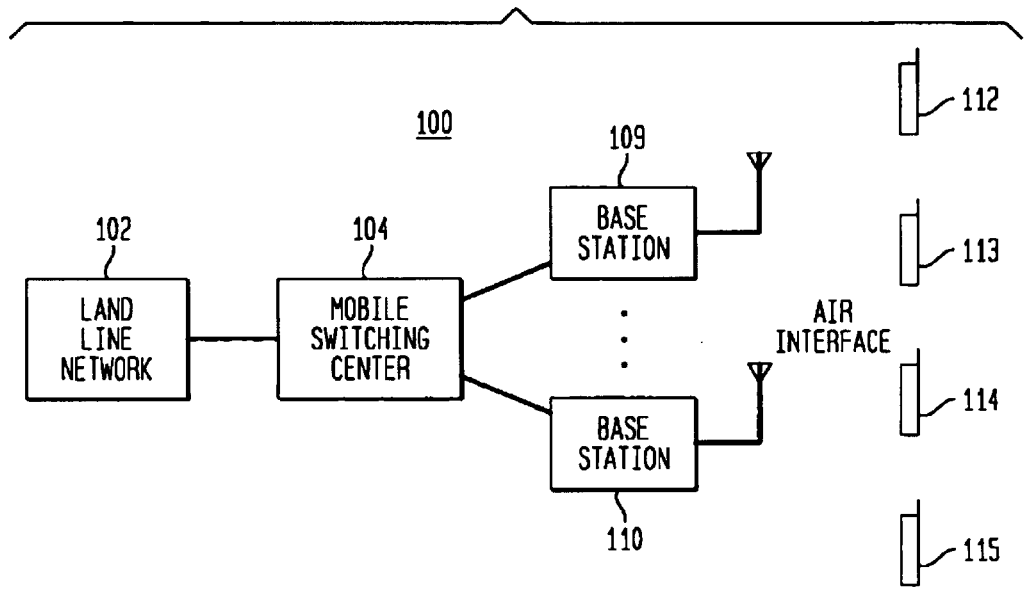
FIG. 1 is a block diagram showing a typical wireless network.
Figure 2:
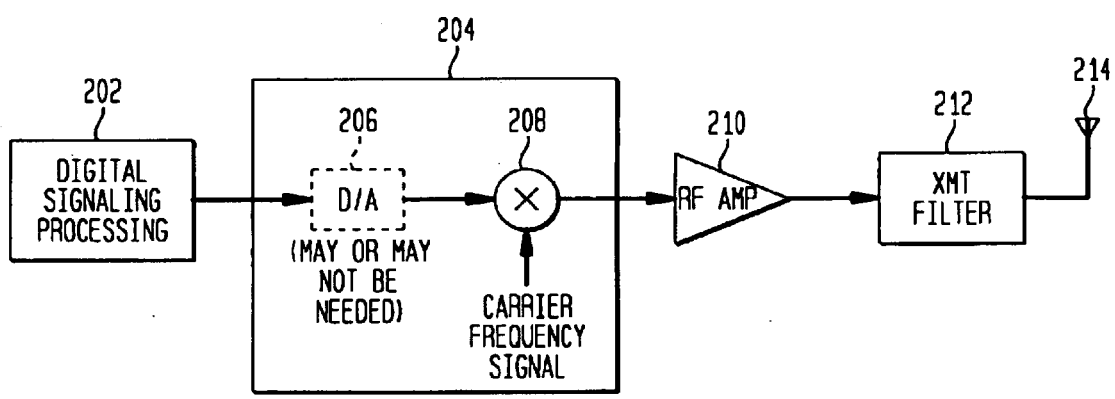
FIG. 2 is a block diagram of a transmit portion, or forward link, of the wireless network as shown in FIG. 1.
Figure 3:
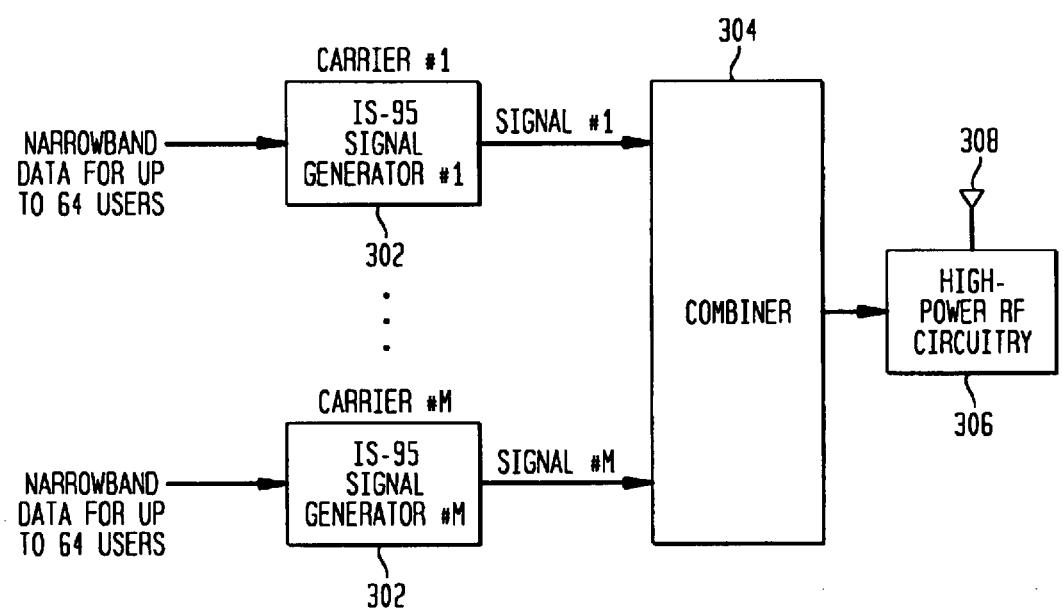
FIG. 3 is a block diagram of a transmit portion of the wireless network of FIG. 1 conforming to the IS-95 standard.
Figure 4:
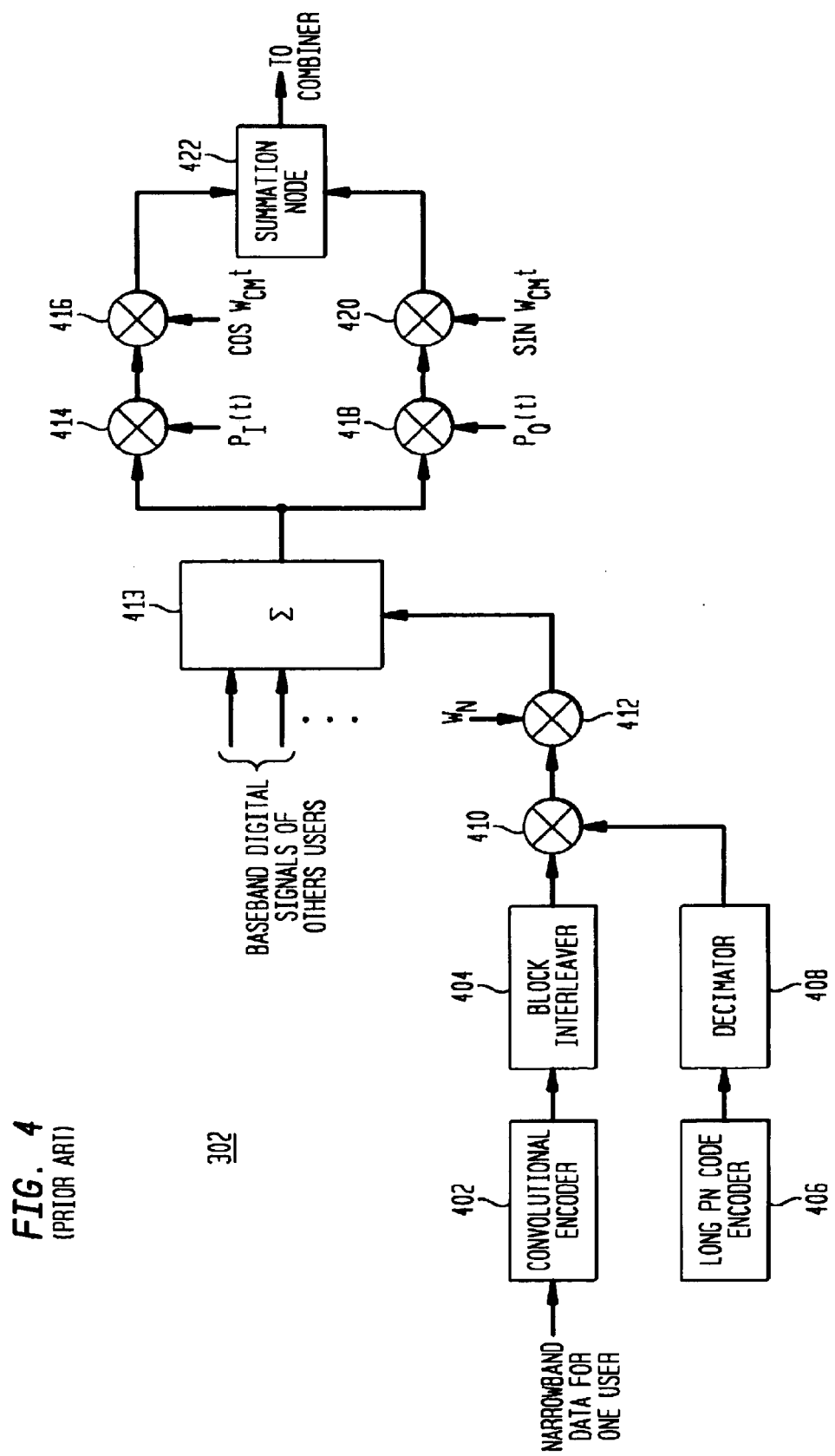
FIG. 4 is a block diagram of a portion of each signal generator of the transmit portion of FIG. 3 of the wireless network of FIG. 1.
Figure 5:
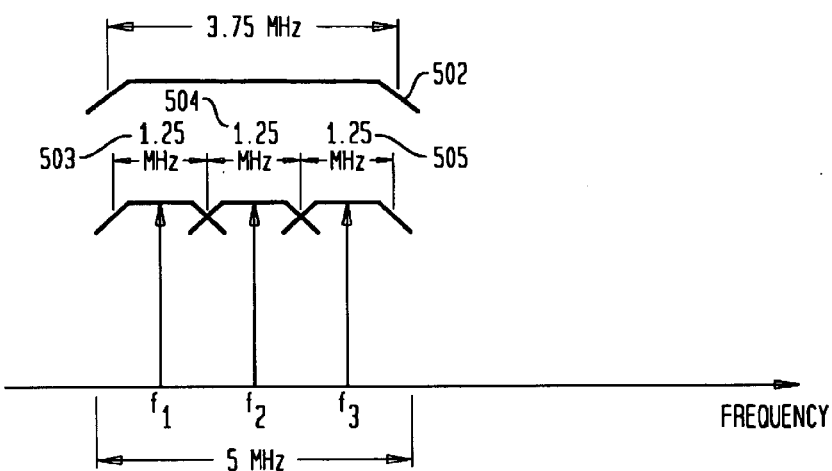
FIG. 5 illustrates a relationship between carrier frequency bands for an IS-95 standard and a proposed wideband overlay network standard occupying a 5-MHz total bandwidth.
Figure 6:
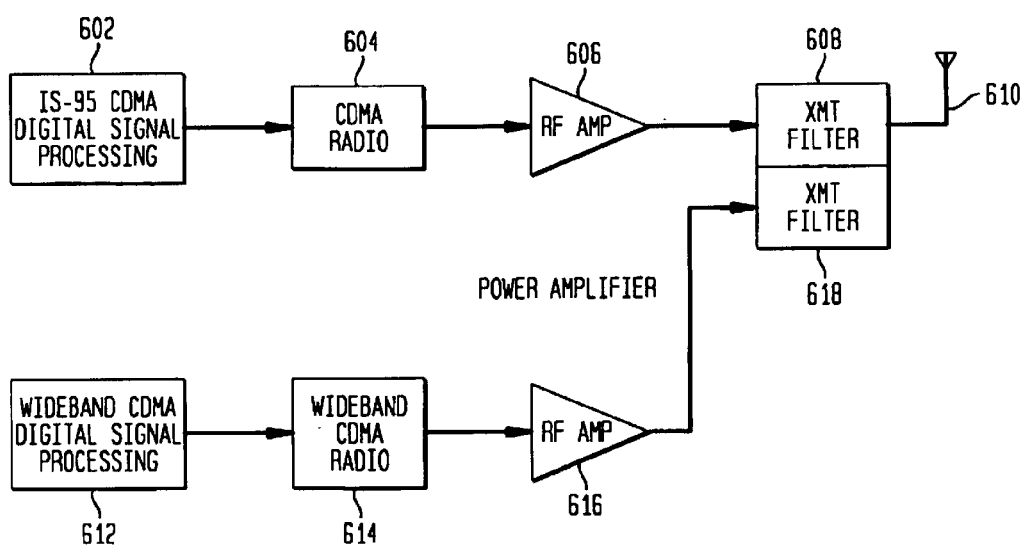
FIG. 6 is a block diagram showing a combination of IS-95 standard signals and signals of a proposed wideband overlay network for transmission over a network as shown in FIG. 1.

FIG. 6 is a block diagram showing a first embodiment of an RF processing technique for combination of IS-95 standard signals of a low-rate CDMA system and proposed wideband CDMA standard signals of a high-rate CDMA system for transmission over a wireless network as shown in FIG. 1. The RF processing technique of FIG. 6 may be employed when frequency overlay, such as that shown in FIG. 5, is desired. As shown in FIG. 6, RF processing of the transmit portion of a base station includes two separate RF processing paths. A first path includes low-rate signal processing 602 for IS-95 signal processing and CDMA radio circuitry 604 which may be, for example, similar to that shown in blocks 302 and 304 of FIG. 3. The first path also includes narrowband RF amplifier 606 and transmit filter 608. A second path includes high-rate CDMA signal processor 612 for signal processing according to, for example, the wideband CDMA standard, wideband CDMA radio circuitry 614, wideband RF amplifier 616 and transmit filter 618. Only after both paths are separately processed are the high power (amplified) signals conforming to the IS-95 standard and wideband CDMA standard provided to antenna 610.

As is known, RF processing techniques are equally applicable to omni-directional systems or to each single sector of a multi-sector system. RF processing as shown in FIG. 6 may be employed if the chip rate of the wideband CDMA overlay network is or is not a multiple of the narrowband chip rate, and/or encoding functions employed in the wideband CDMA portion of the system may or may not be compatible with those used in the narrowband portion of the system. Consequently, the RF processing technique as shown in FIG. 6 may be employed in, for example, IS-95 systems when the wideband CDMA signal encoding of the high-data rate signals is either the same or different from the low-data rate signal encoding.

The RF processing technique of FIG. 6 is a simple, but not necessarily preferred method to combine the low-rate and high-rate CDMA systems since both systems are essentially separated until respective RF modulated signals are provided to the antenna. Consequently, little or no shared use occurs in a base station between existing RF portions of, for example, the IS-95 system and the new wideband CDMA system. Such RF processing technique as shown in FIG. 6 may have high associated cost for implementation.

If there is no compatibility between the IS-95 and wideband portions of the system, different RF spectrums are desirably used by the two portions of the system. Different RF spectrums are used because the signals generated in the IS-95 system are not orthogonal to the signals generated in the wideband CDMA overlay network. Overlaying each frequency spectrum of non-orthogonal signals results in significant interference noise seen by a receiver, resulting in a loss of system capacity. However, if there is compatibility between the IS-95 system and wideband CDMA system portions, the two portions of the system may use the same RF spectrum. This compatibility is because the signals generated in the IS-95 system are orthogonal to the signals generated in the wideband CDMA overlay network. Consequently, orthogonality minimizes interference noise between the different systems.

The wideband CDMA communication system may be defined to be compatible with the IS-95 communication system as described so that both have common spreading chip rates and employ Walsh codes of a common superset. Further, it is desirable that Walsh codes for the wideband CDMA and IS-95 systems are assigned to user channels so as to be orthogonal. Wideband CDMA systems may employ Walsh codes of variable chip-lengths for forward links. Also, wideband CDMA systems may employ a subset of Walsh codes derived from a larger Walsh code space having Walsh codes of longer chip length than the Walsh codes of the subset. As is known, Walsh codes of differing lengths are not necessarily orthogonal to one another, and so Walsh codes of IS-95 and wideband CDMA systems are not necessarily orthogonal. Consequently, for systems in accordance with the present invention a Walsh code administration function of the base station assigns Walsh codes to IS-95 and wideband CDMA users so as to maintain orthogonality of Walsh codes within the forward links.

In the proposed Wideband CDMA system, the digital signal stream that modulates the wideband CDMA carrier-frequency into a particular 5-MHz carrier-frequency band may be defined so that the digital signal of the spread, high data-rate signal is compatible with the IS-95 digital signal. In this approach, the high data-rate signal is divided into, for example, thirds, and each third is spread by a Walsh code having a chip rate identical to the IS-95 chip rate, thereby yielding an effective chip rate that is three times the IS-95 chip rate. Each resulting spread digital bit stream modulates one of three IS-95 carrier frequencies to produce a 5-MHz carrier-frequency band. The IS-95 carrier frequencies are contiguous, and the three modulated signals fill the 5 MHz frequency band of interest. Other bandwidths that are multiples of 5 MHz (e.g., 10, 15, and 20 MHz) are accommodated by this method where a larger number of contiguous IS-95 carriers are used to compose the desired bandwidth.

Using this technique, the encoding Walsh functions may be easily apportioned between the IS-95 system and the wideband CDMA overlay system by the Walsh code administration function of the base station. Consequently, user channels generated in a wideband CDMA system and in an IS-95 system may be made orthogonal to one another.

Further, such a design may overlay the RF spectrum of the wideband CDMA overlay system such that the same carrier frequencies are used for both the IS-95 system and the wideband CDMA system. For example, a 5 MHz bandwidth of the wideband CDMA overlay network may encompass the same three carrier frequencies used in the IS-95 system.

Figure 7:
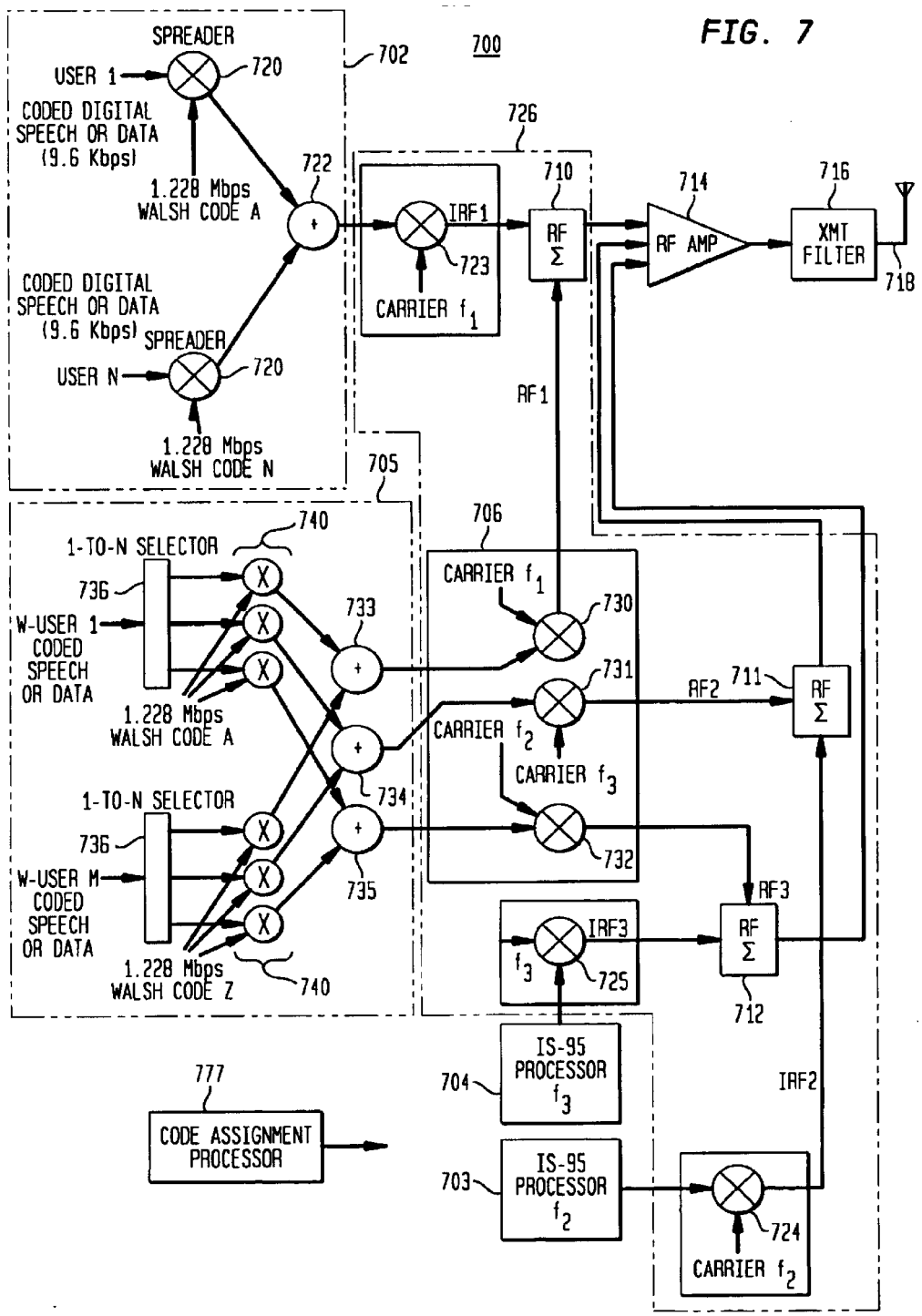
FIG. 7 is a block diagram of a second exemplary embodiment of the present invention in which both wideband CDMA and IS-95 systems share common RF processing portions of a base station.

FIG. 7 is a block diagram of a base station transmit portion 700 of a second exemplary embodiment of the present invention in which both wideband CDMA and IS-95 systems share common RF processing portions of a base station. The second exemplary embodiment may be preferred for implementation with modulated carriers signals in the analog domain that are combined with existing analog carrier-modulation circuitry. The second exemplary embodiment may be applicable to each sector of a multi-sector system or applicable to an omni-directional system. As shown in FIG. 7, transmit portion 700 includes low-rate CDMA processors 702, 703 and 704; high-rate CDMA processor 705; low-power combiner section 726 having multi-carrier modulator 706, multipliers 723, 724 and 725, and RF combiners 710, 711 and 712; RF amplifier 714; transmit filter 716 and antenna 718. Transmit portion 700 also includes code assignment processor 777. Code assignment processor 777 assigns spreading codes, such as Walsh codes, to users so as to maintain orthogonality between channels. Each of the low-rate CDMA processors 702, 703 and 704 of transmit portion 700 may be an IS-95 processor spreading and digitally summing low data-rate data signals from IS-95 users for modulation by a respective RF carrier frequency $f_1$, $f_2$, and $f_3$.

For the example of low-rate CDMA processor 702, each user's coded digital speech, coded voiceband data or digital data is spread with a respectively assigned Walsh code by multiplier 720 to form a digital IS-95 bit stream. The digital IS-95 bit streams from IS-95 users are then summed in adder 722, and the summed IS-95 digital bit streams form a low-rate CDMA channel signal that modulates RF carrier frequency $f_1$ in multiplier 723 to provide an IS-95 low-power RF signal IRF1. In a similar manner, low-rate CDMA processors 703 and 704 and multipliers 724 and 725 provide IS-95 low power RF signals IRF2 and IRF3, respectively. This process is shown in FIG. 7 for the three RF carriers $f_1$, $f_2$, and $f_3$ in the IS-95 system of transmit portion 700.

For the wideband CDMA system of the transmit portion 700, high-rate CDMA processor 705 generates three baseband digital bit streams in 1-to-N selector 736 for each wideband CDMA system user having a high data-rate signal. High-rate CDMA processor multiplies, by a respective Walsh code, each of the three baseband digital bit streams in corresponding multipliers 740 that act as signal spreaders. The 1-to-N selector 736 divides the digital bit stream into three baseband digital bit streams by sequentially providing bits to output ports of the 1-to-N selector 736 in a periodic manner while extending the bit period of the bits appearing at each output port. Each of the wideband CDMA system users is assigned a different Walsh code in accordance with the Walsh code administration function of code assignment processor 777 for each of the three baseband digital bit streams. Although FIG. 7 illustrates each wideband CDMA system user receiving a single Walsh code, as would be apparent to one skilled in the art, each wideband CDMA system user may have a different Walsh code assigned for spreading each baseband stream. As described previously, the respective Walsh code assigned to a wideband CDMA system user may have a chip rate equivalent to that used in the low-rate CDMA processors 702–704.

Each spread baseband digital bit stream for each wideband CDMA system user is employed to form a component CDMA data signal and is assigned to a respective one of RF carrier frequencies $f_1$, $f_2$, and $f_3$. Each spread baseband digital bit stream for each wideband CDMA system user is provided to a corresponding adder 733 (for frequencies $f_1$), adder 734 (for frequency $f_2$), or adder 735 (for frequency $f_3$). Adders 733–735 sum the respective users spread of baseband digital bit streams digitally to produce a corresponding component CDMA data signal for the targeted specific RF carrier frequency ($f_1$, $f_2$, or $f_3$).

FIG. 7 shows a 1-to-N selector 736 dividing the wideband CDMA system user's digital bit stream into three baseband digital bit streams by sequentially providing bits in a periodic manner. For this case, N is 3, but for a general case N may be an integer greater than 1. The wideband CDMA system user's digital bit stream is divided by N into the baseband digital data streams, and hence the number of component CDMA data signals may be N. Further, if the wideband CDMA system user's high-rate data bit stream is divided, the present invention may include a bit insertion process prior to or during division of the digital bit stream. The bit insertion process adds bits to the high-rate data bit stream, allowing an even division of the high-rate data bit stream by N to maintain a desired data rate for each of the resulting N baseband digital data streams.

Multi-carrier modulator 706 includes multipliers 730–732 which modulate each component CDMA data signal spread at the IS-95 chip rate, with respective ones of carrier frequency $f_1$, $f_2$, and $f_3$. RF carrier signals having frequencies $f_1$, $f_2$, and $f_3$ provided to multi-carrier modulator 706 may either be of the same, or approximately the same, frequency and phase as the carrier frequency signals employed by the IS-95 processors 702–704. This processing by multi-carrier modulator 706 produces three low power RF signals RF1, RF2 and RF3 having the same spectral characteristics as do the same-frequency signals generated in the low-rate CDMA processors 702–704.

Low power RF signals RF1, RF2 and RF3 and corresponding same-carrier frequency IS-95 low-power RF signals IRF1, IRF2 and IRF3 are respectively combined in RF combiners 710–712. RF combiners 710–712 may include synchronization circuitry to synchronize carrier phase of low-power RF signals RF1, RF2 and RF3 and IS-95 low-power RF signals IRF1, IRF2 and IRF3 before combination. The signals from RF combiners 710–712 are then applied to high-power, RF amplifier 714 to provide a single, high-power RF signal, which may have a wide bandwidth. The high-power RF signal is applied to the antenna subsystem, which may include filter 716 and antenna 718. FIG. 7 shows that low-power RF signals at the same frequency are combined into a single signal for application to the antenna subsystem. Therefore, in the approach of the second exemplary embodiment, signal combining between the IS-95 system and wideband CDMA system portions of the base station is accomplished with low-power RF signals.

Combination of low-power RF signals in RF combiners 710–712, techniques for providing these low-power RF signals to RF amplifier 714, filtering by transmit filter 716 and transmission through antenna subsystem 718 are well known in the art, and may principally depend on characteristics of the amplifiers selected for a particular embodiment. For example, if extremely linear, multi-carrier amplifiers are used, then the low-power RF carrier frequency signals for all carriers in the system may be combined together as an input signal to the amplifiers. Alternatively, if individual carrier amplifiers are used, then the IS-95 system and wideband CDMA system low-power RF signals for the same carrier frequency are combined and applied to an amplifier. Amplifiers with linearity performance between the two extremes cited above may be used; in which case the IS-95 system and wideband CDMA system low-power RF signals are combined for subsets of IS-95 carrier frequencies. This approach therefore shows that the power amplifier and antenna subsystems may be shared across the IS-95 system and wideband CDMA system portions of the base station, producing a cost effective design.

Figure 8:
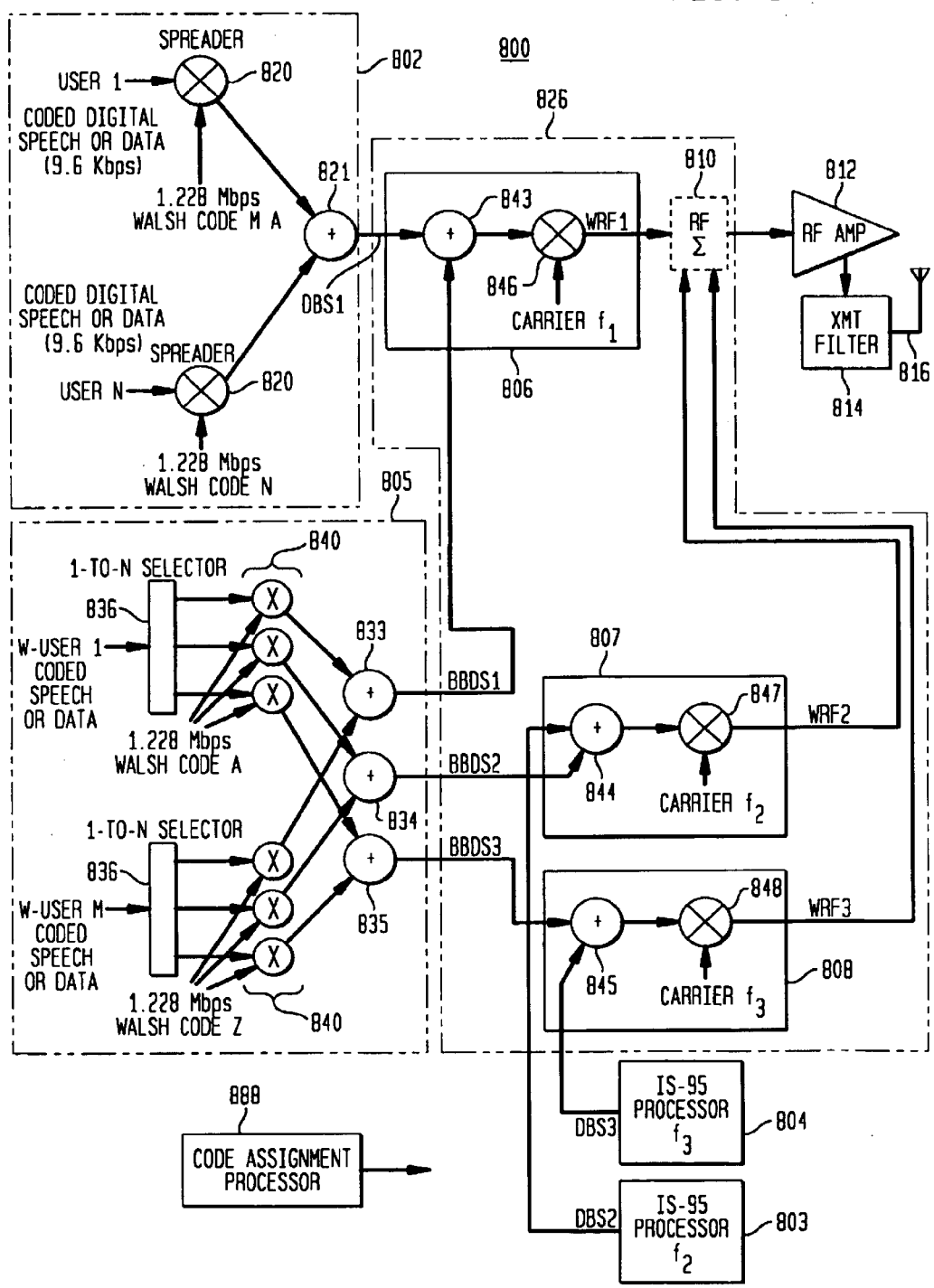
FIG. 8 is a block diagram of a third exemplary embodiment of the present invention in which both wideband CDMA and IS-95 systems share common RF processing portions of a base station.

FIG. 8 is a block diagram of a base station transmit portion 800 of a third exemplary embodiment of the present invention in which both wideband CDMA and IS-95 systems share common RF processing portions of a base station. The third exemplary embodiment as shown in FIG. 8 may be preferred as a cost-effective design. As before, the transmit portion of FIG. 8 may be applicable to each sector of a multi-sector system, or for an omni-directional system. For the third exemplary embodiment, Walsh encoded low-rate (IS-95) and Walsh encoded high-rate (wideband CDMA) digital bit streams of a respective carrier frequency band are summed digitally before modulation by a particular carrier.

As shown in FIG. 8, transmit portion 800 includes low-rate CDMA processors 802, 803 and 804; high-rate CDMA processor 805; low-power combiner section 826 having carrier modulators 806, 807 and 808 and optional RF combiner 810; RF amplifier 812; transmit filter 814 and antenna 816. High-rate CDMA processor 805 and low-rate CDMA processors 802, 803 and 804 of FIG. 8 may be implemented in the same manner as the high-rate CDMA processor 705 and low-rate CDMA processors 702, 703 and 704 of FIG. 7. Transmit portion 800 also includes code assignment processor 888. Code assignment processor 888 assigns spreading codes, such as Walsh codes, to users so as to maintain orthogonality between channels. Each of the low-rate CDMA processors 802, 803 and 804 of transmit portion 800 spreads and digitally sums low-rate digital bit streams from IS-95 system users for modulation by a respective RF carrier frequency $f_1$, $f_2$, and $f_3$.

For the example low-rate CDMA processor 802, each user's coded digital speech, coded voiceband data or digital data is spread with a respectively assigned Walsh code by multiplier 820. The digital bit streams from IS-95 system users are then summed in adder 821, and the summed low-rate digital bit stream DBS1 forms a low-rate CDMA channel signal that is provided to carrier modulator 806 for modulation by RF carrier frequency $f_1$. In a similar manner, low-rate CDMA processors 803 and 804 provide IS-95 digital bit streams DBS2 and DBS3, respectively, as low-rate CDMA channel signals for corresponding carrier modulators 807 and 808. This process is shown in FIG. 8 for the three RF carriers $f_1$, $f_2$, and $f_3$ in the IS-95 portion of the system.

For the wideband CDMA system portion, high-rate CDMA processor 805 generates three baseband digital bit streams for each high-data rate user in 1-to-N selector 836 (N is 3). Then high-rate CDMA processor 805 spreads by a respective Walsh code each of the three baseband digital bit streams in corresponding multipliers 840 to form three component CDMA data signals. As described with respect to FIG. 7, for 1-to-N selector 836, the value of N may be any integer greater than 1 and the bit-insertion process may be employed if desired. Each wideband CDMA system user is assigned a different Walsh code in accordance with a Walsh code administration function by code assignment processor 888. Although FIG. 8 illustrates each wideband CDMA system user receiving a single Walsh code, each user may have a different Walsh code assigned for spreading each baseband stream.

As described previously, the respective Walsh code assigned to a wideband CDMA system user by code assignment processor 888 may have a chip rate equivalent to that used in the low-rate CDMA processors 802–804. Each of the adders 833–835 sum the respective users' baseband digital bit streams digitally to produce a respective component CDMA data signals BBDS1, BBDS2 and BBDS3 for modulation by the targeted specific RF carrier frequency ($f_1$, $f_2$, or $f_3$), respectively. The component CDMA data signals for modulation by a respective one of RF carrier frequencies $f_1$, $f_2$, and $f_3$ are provided to the corresponding carrier modulator 806 (for frequencies $f_1$), carrier modulator 807 (for frequency $f_2$), or carrier modulator 808 (for frequency $f_3$).

Carrier modulators 806, 807 and 808 include respective adders 843–845 and respective multipliers 846, 847 and 848. For example, carrier modulator 806 receives low-rate CDMA channel signal DBS1 and component CDMA data signal BBDS1 that are digitally summed in adder 843 to produce respective CDMA signal for the RF carrier frequency $f_1$. The CDMA signal is modulated by the RF carrier frequency $f_1$ in multiplier 846 to produce low-power RF signal WRF1. In a similar manner, carrier modulators 807 and 808 provide low-power RF signals WRF2 and WRF3, respectively.

The three low-power RF signals WRF1, WRF2 and WRF3 may be combined in wideband RF combiner 810, but these three low-power RF signals may also be provided to the high-power, RF amplifier 812 directly. The signal from RF combiner 810 is then applied to high-power, RF amplifier 812 to provide a single, high-power RF wideband signal for application to an antenna subsystem, which may include filter 814 and antenna 716.

The details of the amplifier arrangement and antenna coupling depend on the types of amplifiers and filters that are used, as discussed above with respect to FIG. 7. FIG. 8 shows that, for the third exemplary embodiment, each third of the users' wideband CDMA systems digital baseband signal is summed with a respective IS-95 system users' digital baseband signal targeted to modulate the corresponding IS-95 RF carrier frequency ($f_1$, $f_2$, or $f_3$). The summing process produces three independent summed digital baseband bit streams. Each of the three summed digital baseband bit streams now modulates one of three IS-95 RF carrier frequency $f_1$, $f_2$, and $f_3$, to produce three low-power RF signals. Each low-power RF signal includes modulation components from both the IS-95 and the wideband CDMA processing portions. Therefore, in this approach of the third embodiment, signal combining between the IS-95 and wideband CDMA portions of the base station system is accomplished with digital signals.

Thus, as an advantage of the third exemplary embodiment of FIG. 8, the entire transmit radio design and amplifier/filter chain used for an IS-95 system may be reused to support a wideband CDMA system. This third embodiment may be employed where IS-95 system and wideband CDMA system frequencies overlay one another in the same frequency spectrum. Alternatively, the third embodiment supports IS-95 system users without the presence of wideband CDMA system users, or wideband CDMA users without the presence of IS-95 users.

The exemplary embodiments as shown in FIG. 7 and FIG. 8 show each of the three summed and spread digital baseband bit streams of low-rate and high-rate users modulating one of three IS-95 RF carrier frequencies $f_1$, $f_2$, and $f_3$, to produce three low-power RF signals. Each low-power RF signal includes modulation components from both the IS-95 system and the wideband CDMA system processing portions. However, the present invention is not so limited. For example, a single wideband user's digital bit stream may divided by N and the baseband digital data streams spread with different Walsh codes. Further, the N resulting component CDMA data signals may be assigned to the same carrier signal. Hence, a single wideband user's signal is divided by N and the N component CDMA data signals are transmitted through the same frequency spectrum of a single IS-95 channel. Therefore, in accordance with the present invention, signal combining between the IS-95 system and wideband CDMA system portions of the base station may be accomplished in any order and assigned in any combination with respect to available frequency bands of the IS-95 RF carrier frequencies as long as orthogonality of assigned Walsh codes is maintained.

In accordance with the present invention, the RF components used for a base station transmit portion of an IS-95 system may be reused to support a transmit portion of a wideband CDMA system in a 5 MHz bandwidth, or M times 5 MHz bandwidth where M is an integer greater than 0. Hence, a single base station may support either IS-95 channels alone, wideband CDMA channels alone, both types of channel together in a frequency overlay arrangement, or combinations of overlay and standalone spectral configurations in a single base station. Further, the approaches described herein may be used to support multiple wideband CDMA carriers and multiple IS-95 carriers in a single base station. Each wideband CDMA carrier-frequency bandwidth, each comprising at least two IS-95 CDMA carriers, may operate in overlay with the corresponding IS-95 carrier-frequencies, or in isolation from the IS-95 carrier frequencies. In all cases, the RF subsystems designed for IS-95 usage may be reused to provide wideband CDMA communication service, resulting in a reduction in design time and development cost.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A transmitter for communicating using code division multiple access (CDMA) comprising:
   a high-rate CDMA processor, adapted to
      1) generate, by at least one one-to-N selector, N an integer greater than 1, a first set of lower rate data signals from a higher rate data signal associated with a higher data rate user, and
      2) generate a first set of spread lower rate data signals using the first set of lower rate data signals;
   a low-rate processor adapted to generate a second set of spread lower rate data signals from at least one lower rate data signal associated with a lower data rate user; and
   a combiner section adapted to combine first selected ones of the first and second sets of spread lower rate data signals to form a first combined set,
   wherein the transmitter is adapted to transmit the first combined set as a low-power modulated carrier signal using a first frequency carrier signal,
   wherein the higher rate data signal has at least one assigned orthogonal code,
   wherein each one-to-N selector is adapted to divide the corresponding higher rate data signal into N lower rate data signals for the first set of lower rate data signals by periodically selecting values of the higher data rate user's higher rate data signal for each of the N lower rate data signals, and
   wherein the high-rate CDMA processor comprises at least two spreaders, each spreader combining one of N lower rate data signals with the assigned orthogonal code to form the corresponding one of the first set of spread lower rate data signals.

2. The transmitter as recited in claim 1, wherein the first frequency carrier signal is one of a plurality of carrier signals, each carrier signal having a corresponding frequency, and wherein the combiner section further comprises:
   a first plurality of multipliers, each multiplier modulating a corresponding one of the plurality of carrier signals with one of the second set of spread lower rate data signals;
   a second plurality of multipliers, each multiplier modulating a corresponding carrier signal with one of the first set of spread lower rate signals; and
   a plurality of signal combiners, each signal combiner adding a pair of the first and second sets of spread lower rate data signals modulated by the same carrier signal to form the corresponding low-power modulated carrier signal.

3. The transmit system as recited in claim 2, wherein each signal synchronizes, in carrier-phase, the pair of the first and second sets of spread lower rate data signals.

4. The transmitter as recited in claim 1, wherein the first frequency carrier signal is one of a plurality of carrier signals, each carrier signal having a corresponding frequency, and wherein the combiner section comprises:
   a plurality of adders, each adder digitally summing a pair of the first and second sets of spread lower rate data signals; and
   a plurality of multipliers, each multiplier modulating s corresponding one of the plurality of carrier signals with the corresponding pair of the first and second sets of spread lower rate data signals to form a corresponding low-power modulated carrier signal.

5. The transmitter as recited in claim 1, wherein the high-rate processor includes a bit-insertion processor, the bit-insertion processor inserting values into the high data rate user's higher rate data signal so as to evenly divide the user data signal into N component data signals having equivalent data rates.

6. The transmitter as recited in claim 1, wherein the N is three.

7. The transmitter as recited in claim 1, further comprising a code assignment processor, wherein the code assignment processor provides each assigned orthogonal code employed by the high-rate CDMA processor and at least one assigned orthogonal code employed by each low-rate processor so as to maintain orthogonality between all assigned orthogonal codes.

8. The transmitter as recited in claim 7, wherein each assigned orthogonal code is a Walsh code.

9. The transmitter as recited in claim 1, wherein the higher rate data signal comprises at least two user data signals, the CDMA processor is further adapted to 1) generate a set of lower rate data signals for each user data signal and 2) a corresponding set of spread lower rate data signals for each user data signal, and the high-rate CDMA processor further comprises at least two adders, each adder receiving one of each set of spread lower rate signals for each user data signal.

10. The transmitter as recited in claim 1, wherein the transmitter is included in a base station of a wireless network, the base station includes an amplifier to transform the first low power modulated carrier signal into a high power transmit signal, and the base station includes an antenna coupled to the amplifier to provide the high-power transmit signal to a CDMA communication channel.

11. The transmitter as recited in claim 10, wherein each of the first set of spread lower rate data signals has a spreading chip rate equivalent to a spreading chip rate of each of the second set of spread lower rate data signals, and each of the first and second sets of spread lower rate signals has a corresponding spreading code chosen from an orthogonal code set.

12. The transmitter as recited in claim 11, wherein a frequency bandwidth of each low-power modulated carrier signal is 1.25 MHz, a frequency bandwidth of the high power transmit signal is M times 5 MHz, M being an integer greater than zero, and a transmit frequency bandwidth of the higher rate data signal is M times 5 MHz.

13. The transmitter as recited in claim 1, wherein:
the combiner section is adapted to combine second selected ones of the first and second sets of spread lower rate data signals to form a second combined set; and
the transmitter is adapted to transmit the second combined set as a second low-power modulated carrier signal using a second frequency carrier signal, the first and second frequencies being different.

14. The transmitter as recited in claim 13, further comprising an amplifier, adapted to receive each low-power modulated carrier signal and generate a high-power transmit signal, wherein the power of the high-power transmit signal is greater than the power of the each low-power modulated carrier signal.

15. The transmitter as recited in claim 13, wherein the combiner section includes a wideband RF summing amplifier adapted to receive each low-power modulated carrier signal, each low-power modulated carrier signal having a corresponding one of a plurality of carrier signal frequency bands, the wideband RF summing amplifier having a carrier signal frequency band including the plurality of carrier signal frequency bands, and the wideband RF summing amplifier is adapted to combine each low-power modulated carrier signal.

16. The transmitter as recited in claim 13, wherein the combiner section includes an RF summing amplifier corresponding to each combined set, the RF summing amplifier combining at least two modulated signals, each modulated signal formed from a selected one of the first set of spread data signals and from a selected one of the second set of spread signals to provide the respective low-power modulated carrier signal having a frequency band on an order of a frequency band of the RF summing amplifier.

17. The transmitter as recited in claim 1, wherein the first set of lower rate data signals are baseband signals.

18. A method of communicating using code division multiple access (CDMA) comprising the steps of:
a) generating, with a one-to-N selector, N an integer greater than 1, a first set of lower rate data signals from a higher rate data signal associated with a higher data rate user,
wherein step (a) comprises the step of periodically selecting values of the higher data rate user's higher rate data signal for each of the N lower rate data signals to divide the corresponding higher rate data signal into N lower rate data signals for the first set of lower rate data signals;
b) generating a first set of spread lower rate data signals using the first set of lower rate data signals associated with the higher data rate user,
wherein step (b) comprises the steps of assigning to the higher rate data signal at least one assigned orthogonal code and combining one of N lower rate data signals with the assigned orthogonal code to form the corresponding one of the first set of spread lower rate data signals;
c) generating a second set of spread lower rate data signals from at least one lower rate data signal associated with a lower data rate user; and
d) combining first selected ones of the first and second sets of spread lower rate data signals to form a first combined set; and
e) transmitting the first combined set using a first frequency carrier signal.

19. The method as recited in claim 18, further comprising the step of amplifying each low-power modulated carrier signal to generate a high-power transmit signal, wherein the power of the high-power transmit signal is greater than the power of the each low-power modulated carrier signal.

20. The method as recited in claim 18, further comprising the step of coordinating code assignment of each spreading code of the selected ones of the first and second sets of spread lower rate data signals so as to maintain orthogonality between the selected ones of the first and second sets of spread lower rate data signals.

21. The method as recited in claim 18, wherein the combining step d) is either digitally combining each of the selected ones of the first and second sets of spread lower rate data signals before modulation by the first frequency carrier signal or analog combining each of the selected ones of the first and second sets of spread lower rate data signals after modulation of each signal by the first frequency carrier signal.

22. The method as recited in claim 18, wherein the combining step d) further includes the steps of:
c1) modulating the first frequency carrier signal with the corresponding selected one of the first set of spread lower rate data signals;
c2) modulating the first frequency carrier signal with the corresponding selected one of the second set of spread lower rate data signals; and
c3) analog-combining each modulated selected ones of the first and second sets of spread lower rate data signals modulated by the first frequency carrier signal to form the first low-power modulated carrier signal.

23. The method as recited in claim 18, wherein the combining step d) further includes the steps of:
d1) digitally summing each selected one of the first and second sets of spread lower rate data signals; and
d2) modulating the first frequency carrier signal with the corresponding digitally summed signal of step d1) to form the first low-power modulated carrier signal.

24. The method as recited in claim 18, wherein the steps a) and c) generate each of the first and second sets of spread lower rate data signals with a substantially equivalent chip rate and with a spreading code chosen from an orthogonal code set.

25. The method as recited in claim 18, wherein the step a) generates each of the first set of lower rate data signals by the steps of a1) periodically selecting bit values of the high data rate user's higher rate data signal for each of the first set of lower rate data signals and a2) inserting, as necessary, bit values into at least one of the first set of lower rate data signals to maintain a substantially equivalent data-rate for each of the first set of lower rate data signals.

26. The method as recited in claim 18, further comprising the steps of:
   combining second selected ones of the first and second sets of spread lower rate data signals to form a second combined set; and
   transmitting the second combined set as a second low-power modulated carrier signal using a second frequency carrier signal, the first and second frequencies being different.

27. The method as recited in claim 18, wherein, for step (a), the first set of lower rate data signals are baseband signals.

28. Apparatus for generating a high-power transmit signal for transmission comprising:
   first signal generating means for generating, by at least one one-to-N selector, N an integer greater than 1, a first set of lower rate data signals from a higher rate data signal associated with a higher data rate user;
   second signal generating means for generating a first set of spread lower rate data signals using the first set of lower rate data signals;
   third signal generating means for generating a second set of spread lower rate data signals from at least one lower rate data signal associated with a lower data rate user; and
   signal combining means for combining first selected ones of the first and second sets of spread lower rate data signals to form a first combined set; and
   transmitting means for transmitting the first combined set as a first low-power modulated carrier signal using a first frequency carrier signal,
   wherein the higher rate data signal has at least one assigned orthogonal code,
   wherein each one-to-N selector divides the corresponding higher rate data signal into N lower rate data signals for the first set of lower rate data signals by periodically selecting values of the higher data rate user's higher rate data signal for each of the N lower rate data signals, and
   wherein the signal combining means comprises at least two spreaders, each spreader combining one of N lower rate data signals with the assigned orthogonal code to form the corresponding one of the first set of spread lower rate data signals.

29. The apparatus as recited in claim 28, wherein:
   the signal combining means combines second selected ones of the first and second sets of spread lower rate data signals to form a second combined set; and
   the transmission means transmits the second combined set as a second low-power modulated carrier signal using a second frequency carrier signal, the first and second frequencies being different.

30. The transmitter as recited in claim 29, further comprising an amplifying means for amplifying each low-power modulated carrier signal to generate a high-power transmit signal, wherein a power of the high-power transmit signal is greater than a power of the each low-power modulated carrier signal.

31. The transmitter as recited in claim 29, wherein the signal combining means includes a wideband RF summing means for combining each low-power modulated carrier signal, each low-power modulated carrier signal having one of a plurality of carrier signal frequency bands and the wideband RF summing means having a bandwidth including the plurality of carrier signal frequency bands.

32. The transmitter as recited in claim 29, wherein the signal combining means includes, for each carrier signal, an RF summing means for combining at least two modulated signals to provide the respective low-power modulated carrier signal having a frequency band on an order of a frequency band of the RF summing means.

33. The apparatus as recited in claim 28, wherein the first set of lower rate data signals are baseband signals.

\* \* \* \* \*